US011651345B2

(12) United States Patent
Rojas

(10) Patent No.: US 11,651,345 B2
(45) Date of Patent: May 16, 2023

(54) SHOPPING CART SCANNING DEVICE

(71) Applicant: Mikaela Rojas, Raleigh, NC (US)

(72) Inventor: Mikaela Rojas, Raleigh, NC (US)

(*) Notice: Subject to any disclaimer, the term of this patent is extended or adjusted under 35 U.S.C. 154(b) by 0 days.

(21) Appl. No.: 17/095,348

(22) Filed: Nov. 11, 2020

(65) Prior Publication Data
US 2022/0147965 A1 May 12, 2022

(51) Int. Cl.
G06Q 20/20 (2012.01)
G06K 7/14 (2006.01)
G06K 19/06 (2006.01)
G06Q 20/32 (2012.01)
G06K 7/10 (2006.01)
G07G 1/00 (2006.01)

(52) U.S. Cl.
CPC ......... *G06Q 20/208* (2013.01); *G06K 7/1413* (2013.01); *G06K 7/1417* (2013.01); *G06K 19/06028* (2013.01); *G06K 19/06037* (2013.01); *G06Q 20/201* (2013.01); *G06Q 20/202* (2013.01); *G06Q 20/204* (2013.01); *G06Q 20/327* (2013.01); *G06K 7/10722* (2013.01); *G06K 7/10861* (2013.01); *G06K 2007/10504* (2013.01); *G06Q 20/209* (2013.01); *G06Q 20/3276* (2013.01); *G07G 1/0081* (2013.01)

(58) Field of Classification Search
CPC .... G06Q 20/204; G06Q 20/20; G06Q 20/322; G06Q 20/3278; G06Q 20/202; G06Q 20/208; G06Q 20/327; G06Q 20/201; G06K 7/1413; G06K 7/1417; G06K 19/06028; G06K 19/06037

USPC .......................................................... 705/17
See application file for complete search history.

(56) References Cited

U.S. PATENT DOCUMENTS

| 10,915,936 B1* | 2/2021 | Vora ...................... G07G 1/0081 |
| 2009/0106085 A1* | 4/2009 | Raimbeault ............ G06Q 50/01 705/14.23 |
| 2018/0253604 A1* | 9/2018 | Hiramatsu ......... G06Q 30/0601 |
| 2021/0117950 A1* | 4/2021 | Bentsur .............. G06Q 20/3223 |

OTHER PUBLICATIONS

Selasky, Susan. Cha-ching! At Kroger, scan groceries as you go: New option cuts shop time; available at several stores. Detroit Free Press; Detroit, Mich. [Detroit, Mich]. Mar. 23, 2018: A.1. (Year: 2018).*

(Continued)

*Primary Examiner* — Ariel J Yu
*Assistant Examiner* — Fawaad Haider
(74) *Attorney, Agent, or Firm* — The Iwashko Law Firm, PLLC; Lev Ivan Gabriel Iwashko

(57) ABSTRACT

A shopping cart scanning device, including a main body, a scanner disposed on at least a portion of the main body to scan a machine-readable code of at least one item, a scale movably disposed within at least a portion of the main body to receive the at least one item thereon, such that a weight of the at least one item is determined, a display unit disposed on at least a portion of the main body to display at least one of a price of the at least one item in response to the scanner scanning the at least one item and the weight of the at least one item in response to the scale receiving the at least one item thereon, and a cart clip disposed on at least a portion of the main body to removably connect the main body to a shopping cart.

6 Claims, 1 Drawing Sheet

(56) References Cited

OTHER PUBLICATIONS

Edmiston, Jake. Sobeys tests smart carts to lessen long lineups at checkout counters. The Windsor Star; Windsor, Ont. Oct. 24, 2019. (Year: 2019).*

Poulter, Sean. That's trolley clever!: Amazon's latest delivery: Smart cart that scans groceries itself. Daily Mail; London (UK) [London (UK)]. Jul. 15, 2020: 28. (Year: 2020).*

* cited by examiner

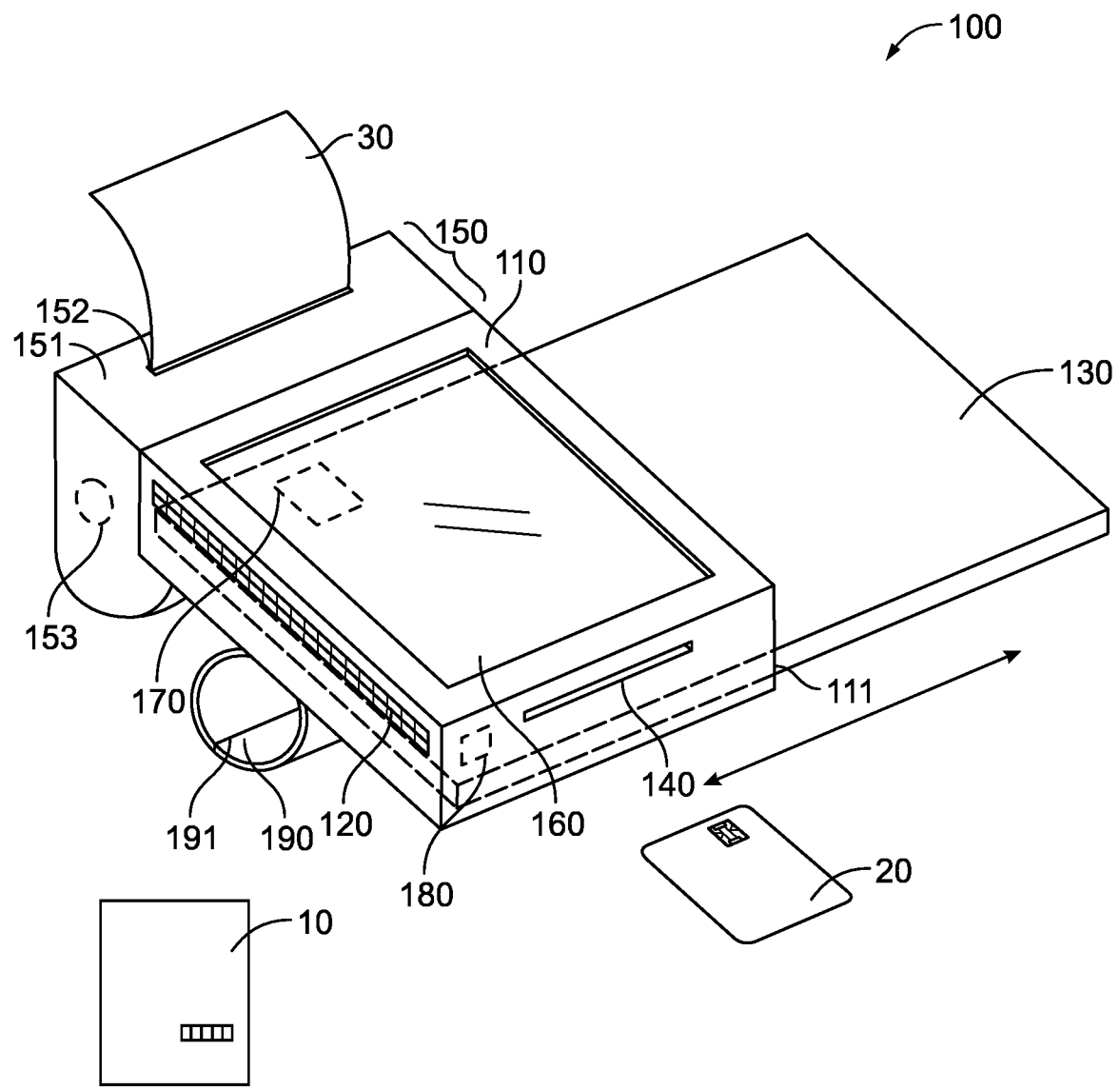

SHOPPING CART SCANNING DEVICE

BACKGROUND

1. Field

The present general inventive concept relates generally to a scanning device, and particularly, to a shopping cart scanning device.

2. Description of the Related Art

Generally, when a person goes shopping at a store, such as a grocery store and/or a department store, the person proceeds to a checkout line to finalize purchase of any desired items. However, the checkout line tends to be lengthy and can take an extensive amount of time to finally reach a cashier. The long wait time that the person must endure can be a problem especially if there are other important matters the person has to handle.

Moreover, the checkout line at most stores is highly inefficient due to loading of a shopping cart by the person, unloading of the desired items at the cashier, and reloading the desired items into the shopping cart after scanning by the cashier. Even self-checkout lines have the same problem.

Therefore, there is a need for a scanning device for a shopping cart that reduces shopping times by allowing customers to purchase items without unloading desired items at the cashier.

SUMMARY

The present general inventive concept provides a shopping cart scanning device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a shopping cart scanning device, including a main body, a scanner disposed on at least a portion of the main body to scan a machine-readable code of at least one item, a scale movably disposed within at least a portion of the main body to receive the at least one item thereon, such that a weight of the at least one item is determined, a display unit disposed on at least a portion of the main body to display at least one of a price of the at least one item in response to the scanner scanning the at least one item and the weight of the at least one item in response to the scale receiving the at least one item thereon, and a cart clip disposed on at least a portion of the main body to removably connect the main body to a shopping cart.

The scanner scanning the machine-readable code may be at least one of a barcode, a QR code, an Aztec code, and a data matrix code.

The shopping cart scanning device may further include a card reader disposed within at least a portion of the main body to receive a card therein, such that the card reader charges funds on the card during a purchase of the at least one item.

The shopping cart scanning device may further include a control unit disposed within at least a portion of the main body to receive input for at least one of determining a total price of the at least one item, purchasing the at least one item, removing the price of the at least one item from the total price, and displaying the price of the at least one item on the display unit in response to the scanner scanning the machine-readable code of the at least one item.

The control unit may include a sensor to detect a proximity to at least one of an entrance to a building, an exit to the building, and a cash register, such that the display unit displays a request to pay for the at least one item.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates an isometric view of a shopping cart scanning device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Shopping Cart Scanning Device 100
Main Body 110
Scale Receiving Aperture 111
Scanner 120
Scale 130
Card Reader 140
Receipt Dispenser 150
Dispenser Body 151
Dispensing Aperture 152
Motor 153
Display Unit 160
Control Unit 170
Power Source 180
Cart Clip 190
Separation Line 191

FIG. 1 illustrates an isometric view of a shopping cart scanning device 100, according to an exemplary embodiment of the present general inventive concept.

The shopping cart scanning device 100 may be constructed from at least one of metal, plastic, wood, and rubber, etc., but is not limited thereto.

The shopping cart scanning device 100 may include a main body 110, a scanner 120, a scale 130, a card reader 140, a receipt dispenser 150, a display unit 160, a control unit 170, a power source 180, and a cart clip 190, but is not limited thereto.

Referring to FIG. 1, the main body 110 is illustrated to have a rectangular prism shape. However, the main body 110 may be rectangular, circular, conical, triangular, pentagonal, hexagonal, heptagonal, octagonal, or any other shape known to one of ordinary skill in the art, but is not limited thereto.

The main body 110 may include a scale receiving aperture 111, but is not limited thereto.

The scale receiving aperture 111 may be disposed on at least a portion of a first side of the main body 110.

The scanner 120 may include a barcode scanner, a quick response (QR) code scanner, an Aztec code scanner, and a data matrix code scanner, but is not limited thereto.

The scanner 120 may be disposed on at least a portion of a second side of the main body 110 opposite with respect to the first side of the main body 110. Moreover, the scanner 120 may scan a machine-readable code, such as a barcode, a QR code, an Aztec code, and/or a data matrix code as disposed on at least one item 10, such that the scanner 120 scans and/or detects a price of the at least one item 10.

The scale 130 may be movably (i.e. slidably) disposed within at least a portion of the scale receiving aperture 111 of the main body 110. Additionally, the scale 130 may move in a first lateral direction or a second lateral direction from retracted within the scale receiving aperture 111 to at least partially extended away from the scale receiving aperture 111. Also, the scale 130 may move in the second lateral direction or the first lateral direction from extended from the scale receiving aperture 111 to retracted within the scale receiving aperture 111.

The scale 130 may be moved by a user and/or a scale motor connected thereto.

The card reader 140 may include an integrated circuit (IC) chip reader, a chip reader, and a magnetic stripe reader, but is not limited thereto.

The card reader 140 may be disposed within at least a portion of a third side of the main body 110 perpendicularly disposed with respect to the first side and/or the second side of the main body 110. Moreover, the card reader 140 may receive a card 20 (e.g., a credit card, a debit card) therein to scan a chip and/or a magnetic stripe of the card 20. As such, the card reader 140 may receive the card 20 to charges and/or debits funds on the card 20.

The receipt dispenser 150 may include a dispenser body 151, a dispensing aperture 152, and a motor 153, but is not limited thereto.

The dispenser body 151 may be disposed on at least a portion of a fourth side of the main body 110 opposite with respect to the third side of the main body 110. The dispenser body 151 may store a receipt roll 30 therein.

The dispensing aperture 152 may be disposed on at least a portion of the dispenser body 151. The dispensing aperture 152 may allow at least a portion of the receipt roll 30 to be dispensed therethrough.

The motor 153 may be disposed within at least a portion of the dispenser body 151. The receipt roll 30 may move (i.e. rotate) in response to rotation of the motor 153, such that the receipt roll 30 moves through the dispensing aperture 152.

The display unit 160 may include a plasma screen, an LCD screen, a light emitting diode (LED) screen, an organic LED (OLED) screen, a computer monitor, a hologram output unit, a sound outputting unit, or any other type of device that visually or aurally displays data.

Furthermore, the display unit 160 may include an input unit as a touchscreen.

The display unit 160 may be disposed on at least a portion of a fifth side of the main body 110. The display unit 160 may display the price of the at least one item 10 in response to being scanned by the scanner 120.

The control unit 170 may include a processing unit (i.e. a processor, a microcontroller), a communication unit (i.e. Wi-Fi, infrared (IR) wireless, satellite communication, Bluetooth, near field communication (NFC), universal serial bus (USB), radio frequency (RF) communication), a storage unit (i.e. random access memory (RAM), read-only memory (ROM), hard disk, flash drive, cloud-based storage, solid state drive), and a sensor (i.e. a weight sensor, a proximity sensor), but is not limited thereto.

The control unit 170 may be disposed within at least a portion of the main body 110. The control unit 170 may receive and/or store the price of the at least one item 10 within the storage unit. Moreover, the control unit 170 may calculate via the processing unit, a total price of a plurality of items 10 scanned by the scanner 120. Furthermore, the control unit 170 may send the total price of the plurality of items 10 and/or a list of the plurality of items 10 to be included on receipt roll 30. Also, the control unit 170 may run a program thereon to perform the operations described herein with respect to the control unit 170.

The control unit 170 via the sensor may determine a weight of the at least one item 10 in response to the scale 130 receiving the at least one item 10 thereon. Additionally, the scale 130 may be extended from the scale receiving aperture 111 via the scale motor in response to a command from the control unit 170 using the display unit 160. As such, the control unit 170 may determine the price of the at least one item 10 based on the weight of the at least one item 10.

Also, the control unit 170 via the sensor may detect a proximity of the sensor to an entrance of a building (e.g., a grocery store, a department store, etc.), an exit of the building, and/or a cash register of the building, such that the control unit 170 sends an alert signal to the display unit 160 to display a request to pay for the at least one item 10.

The control unit 170 via the display unit 160 may receive input thereon, such as turn on and/or turn off, purchase the at least one item 10 using the card reader 140, remove and/or deduct the at least one item 10 from the total price, perform a price scan on the scanner 120, and/or weigh the at least one item 10 on the scale 130.

Alternatively, the control unit 170 may include physical buttons disposed on at least a portion of the main body 110 to perform the above described functions instead of the touchscreen using the display unit 160.

The control unit 170 via the display unit 160 may request a language setting (e.g., English, Spanish, French, German, Chinese, etc.) based on a preference of the user.

The power source 180 may include a battery and a solar cell, but is not limited thereto.

The power source 180 may provide power to the scanner 120, the scale 130, the card reader 140, the receipt dispenser 150, the display unit 160, and/or the control unit 170.

The cart clip 190 may include a separation line 191, but is not limited thereto.

The cart clip 190 may be removably connected to at least a portion of a shopping cart (e.g., a handle of the shopping cart). For example, the cart clip 190 is flexible, such that the cart clip 190 may bend and/or at least partially deform in response to being separated along the separation line 191. In other words, the separation line 191 may facilitate connecting the cart clip 190 to the shopping cart in response to at least partially deforming and returning to its original state after connecting.

Therefore, the shopping cart scanning device 100 may improve shopping times by avoiding use of a cashier to purchase the at least one item 10.

The present general inventive concept may include a shopping cart scanning device 100, including a main body 110, a scanner 120 disposed on at least a portion of the main body 110 to scan a machine-readable code of at least one item 10, a scale 130 movably disposed within at least a portion of the main body 110 to receive the at least one item 10 thereon, such that a weight of the at least one item 10 is determined, a display unit 160 disposed on at least a portion of the main body 110 to display at least one of a price of the at least one item 10 in response to the scanner 120 scanning the at least one item 10 and the weight of the at least one item 10 in response to the scale 130 receiving the at least one item 10 thereon, and a cart clip 190 disposed on at least a portion of the main body 110 to removably connect the main body 110 to a shopping cart.

The scanner 120 scanning the machine-readable code may be at least one of a barcode, a QR code, an Aztec code, and a data matrix code.

The shopping cart scanning device 100 may further include a card reader 140 disposed within at least a portion of the main body 110 to receive a card 20 therein, such that the card reader 140 charges funds on the card 20 during a purchase of the at least one item 10.

The shopping cart scanning device 100 may further include a control unit 170 disposed within at least a portion of the main body 110 to receive input for at least one of determining a total price of the at least one item 10, purchasing the at least one item 10, removing the price of the at least one item 10 from the total price, and displaying the price of the at least one item 10 on the display unit 160 in response to the scanner 120 scanning the machine-readable code of the at least one item 10.

The control unit 170 may include a sensor to detect a proximity to at least one of an entrance to a building, an exit to the building, and a cash register, such that the display unit 160 displays a request to pay for the at least one item 10.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A shopping cart scanning device, comprising:
   a main body comprising a scale receiving aperture;
   a scanner disposed on at least a portion of the main body to scan a machine-readable code of at least one item;
   a scale movably disposed within at least a portion of the main body to receive the at least one item thereon and move from retracted through the scale receiving aperture within an interior of the main body to at least partially extended away from the main body and move from extended away from the main body to retracted through the scale receiving aperture within the interior of the main body, such that a weight of the at least one item is determined, such that the scale moves independent of movement of the main body;
   a display unit disposed on at least a portion of the main body to display at least one of a price of the at least one item in response to the scanner scanning the at least one item and the weight of the at least one item in response to the scale receiving the at least one item thereon; and
   a cart clip disposed on at least a portion of the main body to removably connect the main body to a shopping cart.

2. The shopping cart scanning device of claim 1, wherein the scanner scanning the machine-readable code is at least one of a barcode, a QR code, an Aztec code, and a data matrix code.

3. The shopping cart scanning device of claim 1, further comprising:
   a card reader disposed within at least a portion of the main body to receive a card therein, such that the card reader charges funds on the card during a purchase of the at least one item.

4. The shopping cart scanning device of claim 1, further comprising:
   a control unit disposed within at least a portion of the main body to receive input for at least one of determining a total price of the at least one item, purchasing the at least one item, removing the price of the at least one item from the total price, and displaying the price of the at least one item on the display unit in response to the scanner scanning the machine-readable code of the at least one item.

5. The shopping cart scanning device of claim 4, wherein the control unit comprises:
   a sensor to detect a proximity to at least one of an entrance to a building, an exit to the building, and a cash register, such that the display unit displays a request to pay for the at least one item.

6. A shopping cart scanning device, comprising:
   a main body comprising a scale receiving aperture;
   a scanner disposed on at least a portion of the main body to scan a machine-readable code of at least one item;
   a scale movably disposed within at least a portion of the main body to receive the at least one item thereon and move from retracted through the scale receiving aperture within an interior of the main body to at least partially extended away from the main body and move from extended away from the main body to retracted through the scale receiving aperture within the interior of the main body, such that a weight of the at least one item is determined, such that the scale moves independent of movement of the main body;

a display unit disposed on at least a portion of the main body to display at least one of a price of the at least one item in response to the scanner scanning the at least one item and the weight of the at least one item in response to the scale receiving the at least one item thereon;

a cart clip disposed on at least a portion of the main body to removably connect the main body to a shopping cart; and a receipt dispenser disposed on at least a portion of the main body to dispense a receipt in response to items purchased.

* * * * *